United States Patent [19]

Atcheson

[11] 4,281,866
[45] Aug. 4, 1981

[54] WEED PULLER AND EJECTOR

[76] Inventor: James E. Atcheson, 3203 - 26th, Lubbock, Tex. 79412

[21] Appl. No.: 69,836

[22] Filed: Aug. 27, 1979

[51] Int. Cl.³ .............................................. B66F 3/00
[52] U.S. Cl. .................................. 294/50.5; 254/132
[58] Field of Search ........................... 254/131.5, 132; 294/50.8, 50.9, 50.5

[56] References Cited

U.S. PATENT DOCUMENTS

| | | | |
|---|---|---|---|
| 1,526,652 | 2/1925 | Wilson | 254/132 |
| 1,592,270 | 7/1926 | Johnson | 294/50.5 |
| 1,724,026 | 8/1929 | Joseph | 254/132 |
| 1,882,423 | 10/1932 | Holz | 294/50.9 |
| 2,349,621 | 5/1944 | Mardman | 254/132 |
| 2,783,535 | 3/1957 | Cesare | 294/50.5 |
| 3,865,348 | 2/1975 | Close | 254/132 |

FOREIGN PATENT DOCUMENTS 337352  5/1959  Fed. Rep. of Germany ........ 254/131.5

Primary Examiner—Robert C. Watson
Attorney, Agent, or Firm—Wendell Coffee

[57] ABSTRACT

A metal strap having a pedal, fulcrum and weed pulling trowel is attached to the bottom of an elongated handle. The trowel is bifurcated and notched so it may be forced into the ground by a foot on the pedal and the weed root caught within the slot and pried from the ground by the fulcrum. The weed is ejected from the slot by moving a blade in the slot downward against spring action. In one embodiment the tines of the trowel are twisted on each side of the slot.

6 Claims, 11 Drawing Figures

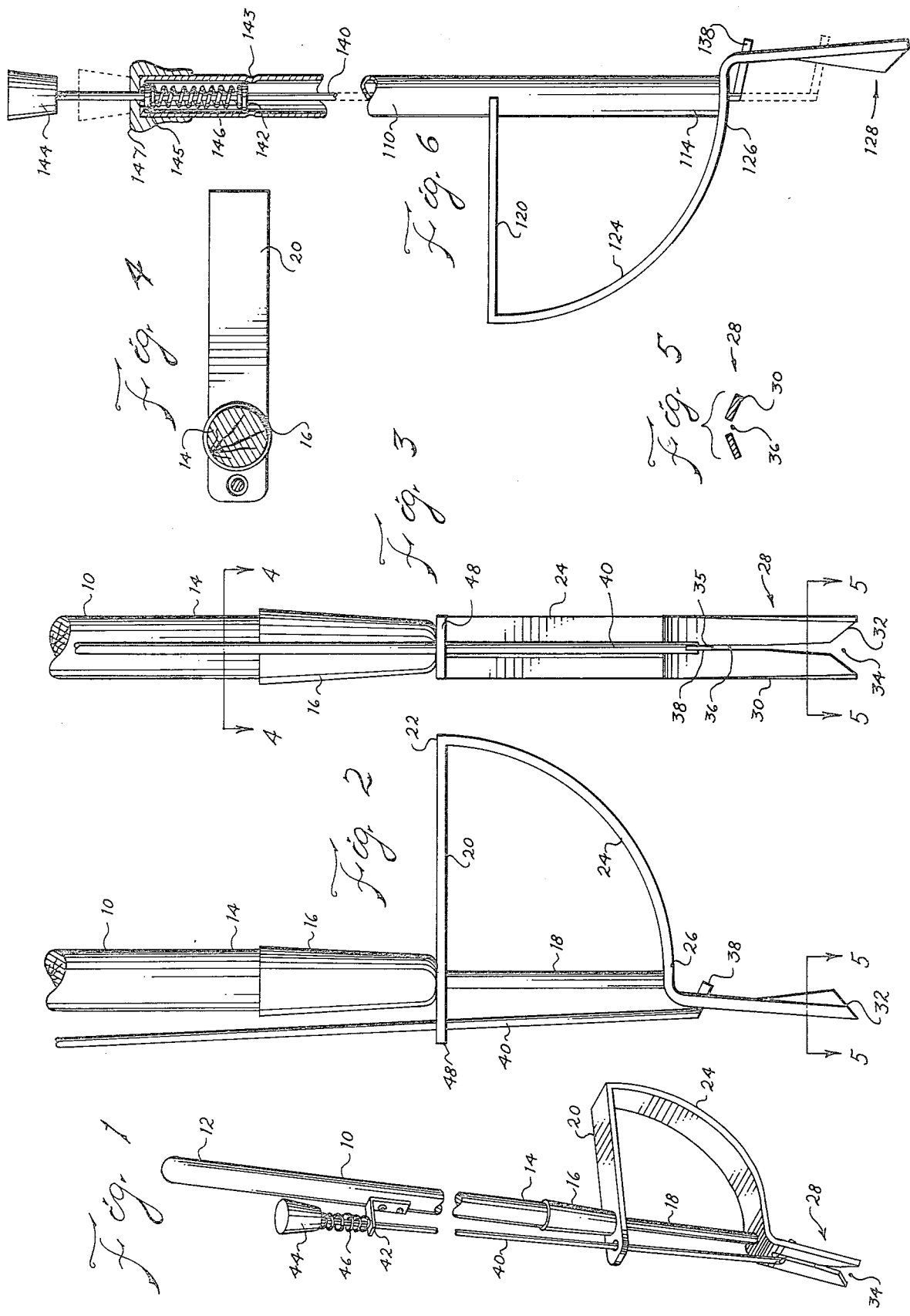

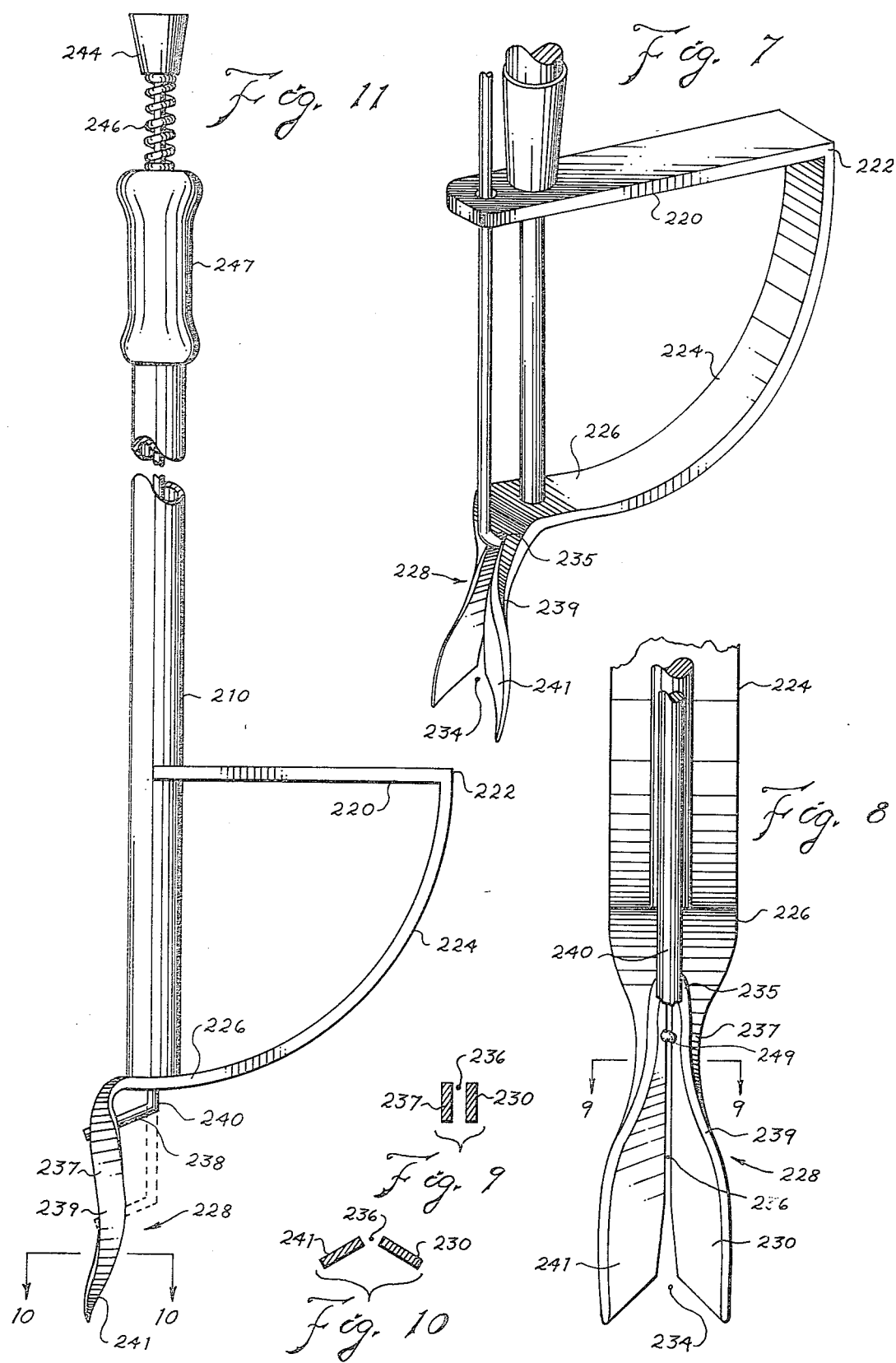

WEED PULLER AND EJECTOR

CROSS REFERENCE TO RELATED APPLICATIONS

None.

BACKGROUND OF THE INVENTION (1) Field of the Invention

This invention relates to ground working implements and more particularly to a trowel for digging weeds up by their roots.

(2) Description of the Prior Art

Dandelions are a problem with lawns. If the weed is cut at the surface of the earth, normally a new plant will emerge from the root. Often weeds are removed by small weeding trowels that have a short handle and an elongated narrow trowel with a notch on the end thereof. This necessitates either the gardener working on his knees or stooping or sitting on the ground adjacent to the portion of the lawn being weeded.

Before filing this application, the applicant was aware of the following patents:
RICE U.S. Pat. No. 1,827,109
DAVISON U.S. Pat. No. 1,857,500
GILSTRAP ET AL. U.S. Pat. No. 1,998,314
GEBHARDT U.S. Pat. No. 2,017,436
MIKKELSON U.S. Pat. No. 2,166,015
KULESH U.S. Pat. No. 2,373,898
STECKER ET AL. U.S. Pat. No. 2,504,746
McKINNEY U.S. Pat. No. 2,532,115

Kulesh discloses a modified form of the short handled weeding trowel described above. It is modified by having a fulcrum so that the weed can be pried from the earth by pushing the handle down.

Gebhardt discloses a weeding device having the notched trowel together with a pedal so that the foot may be used to force the device into the ground and also a heel or fulcrum is provided.

Stecker et al. discloses a modified short handle device as described above. It is modified by having a fork or rake mounted at the end of the handle and further by having a spring loaded fulcrum slidably mounted upon a shank extending from the handle to the notched trowel.

The other patents do not appear to applicant to be more pertinent than those specifically discussed above.

SUMMARY OF THE INVENTION (1) New and Different Function

I have invented an improved weed puller with two specific advantages. First, I have invented a weed puller which is extremely simple and easy to use. The weed is pulled from the ground and there is not cutting or slicing of the roots of the weed. The operation is conducted from a standing position and there is no reason to stoop, kneel, or sit to operate the tool. The tool is easy to use because of the pedal which makes it easy to force the tool into the ground and no particular strain upon the hands of the user is required. The weed is levered from the ground by the fulcrum making this an easy operation. The weed is retained in a slot within the bifurcated trowel so that no raking is necessary. Then the tool with the weed still within the slot can be held over a basket or other trash container and the weed ejected into the trash container by simply pushing a rod to actuate a blade extending in the slot. The slot is graduated so as to accomodate a variety of plant sizes. Not only does the ejection moving the blade through the slot eject the weed, but it also keeps the weed puller free of grass roots and other obstructions which would prevent its easy insertion into the earth and reception of the plant root.

Second, in addition to the extreme ease in use of the tool, the tool has also been designed to be extremely easy and simple to manufacture. The pedal, fulcrum, and bifurcated trowel are all constructed of a single strap of metal. This single strap is attached to the bottom of the handle in a simple manner. The ejector can be made of a single rod which has the end flattened to form a blade to go between the slot and extends through an ear on the upper end of the handle.

Thus it may be seen that the function of the combination of parts far exceeds the sum of the functions of the individual parts such as rods, trowels, and the like.

(2) Objects of this Invention

An object of this invention is to pull weeds.

Further objects are to achieve the above with a device that is sturdy, compact, durable, lightweight, simple, safe, efficient, versatile, ecologically compatible, energy conserving, and reliable, yet inexpensive and easy to manufacture, operate and maintain.

Other objects are to achieve the above with a method that is versatile, ecologically compatible, energy conserving, rapid, efficient, and inexpensive, and does not require skilled people to operate and maintain.

The specific nature of the invention, as well as other objects, uses, and advantages thereof, will clearly appear from the following description and from the accompanying drawings, the different views of which are not scale drawings.

BRIEF DESCRIPTION OF THE DRAWINGS

FIG. 1 is a perspective of an embodiment of my invention with the handle broken for clarity of drawing.

FIG. 2 is a side elevational view of the embodiment seen in FIG. 1 showing the lower end of the handle with the strap forming the pedal, fulcrum and trowel attached thereto.

FIG. 3 is a front elevational view of the parts shown in FIG. 2.

FIG. 4 is a sectional view taken substantially along line 4—4 of FIG. 3.

FIG. 5 is a sectional view taken substantially along line 5—5 of FIGS. 2 and 3.

FIG. 6 is a side elevational view of another embodiment with parts broken away to show details of construction and with the ejector shown in an alternate position by dotted lines.

FIG. 7 is a perspective view of the lower portion of a weed puller similar to FIG. 1 showing a twisted trowel.

FIG. 8 is a front elevational view of the trowel of FIG. 7, with modification.

FIG. 9 is a sectional view taken on line 9—9 on FIG. 8.

FIG. 10 is a sectional view taken on line 10—10 of FIG. 11.

FIG. 11 is a broken side elevational view of a modified handle having a trowel as illustrated in FIG. 7.

DESCRIPTION OF THE PREFERRED EMBODIMENTS

Referring to FIG. 1, there may be seen the weed puller having an elongated handle 10. The handle is illustrated in the embodiments of FIGS. 1 through 4 as a wooden handle having an upper end 12 and a lower end 14. The handle 10 also has an axis. The lower end has a metal thimble 16 surrounding it with a short shaft 18 extending axially from the handle.

A metal strap is formed to have a pedal 20. The pedal 20 has a hole which extends over the shaft 18 and the strap at the pedal 20 is attached as by welding or any other convenient means to the shaft 18 or thimble 16. Therefore, it may be seen that the strap is attached to the lower end of the handle 10. The strap, at the outer or distal end 22 of the pedal, is curved downward forming fulcrum 24. The strap is formed downward until it is at the axis of the handle at point 26. At the point 26 the strap is attached to the bottom of the shaft 18 as by welding.

From the point 26 the strap is bent at substantially right angles so that it extends downward to approximately parallel with the axis of the handle 10. From the bend adjacent to the axis point 26 downward the strap forms the ground-piercing implement or spear or probe or spade or trowel 28. The trowel is bifurcated forming two prongs or tines 30. The ends 32 of the tines are angled inward forming a notch 34 at the bottom thereof. Elongated slot 36 extends from the notch 34 and the notch 34 is angled inward toward the slot, so that when the trowel 28 is forced into the earth, a weed root is guided by the notch 34 into the elongated slot 36. As may be seen, the lower portion of the slot 36 is tapered or larger than the upper part of the slot 36. Therefore, a smaller weed root may be forced on into the upper part, but still the large tapered lower area will accommodate a larger root. As particularly seen in FIG. 5, two tines 30 are shaped flat plates which are angled to one another forming somewhat of a trough or ladle portion of the trowel 28. The shape of the trowel is particularly seen and is as illustrated in FIGS. 2, 3, and 5.

Plate or blade 38 is shown in the drawings, 1, 2 and 3 at the top of the slot 36 which would be at the fork or crotch 35 of the bifurcation. The blade extends through the slot 36. It is integral with or attached at the bottom of rod 40. The rod 40 extends upward to bracket or clip or ear 42 upon the upper end 12 of the handle 10. The bracket is a simple L-shaped bracket attached as by screws to the handle 10. The ear 42 has a hole through which the rod passes. A hand actuator in the form of knob 44 is upon the upper end of the rod 40. Other type or shape actuators could be used which would require less thumb pressure to actuate. Helical compression spring 46 extends from the knob 44 to the top of ear 42 which may be considered part of the handle. The spring 46 biases the rod upward. The rod is also guided by extending through a hole in projection 48 of the pedal 20 portion of the strap.

The embodiment shown in FIG. 6 is quite similar to that described. The handle 110 is a tubular handle made of metal or suitable plastic. The strap includes pedal 120 which may be attached near lower end 114 of the handle by suitable means such as welding. The lower part of fulcrum 124 extends back to an axis point 126 which is attached to the extreme lower end of the handle 110. Trowel 128 is shaped and formed the same as the trowel 28. Blade 138 extends through the slot in the trowel (not shown in FIG. 6 for clarity of the drawing) and is attached to the lower end of the rod 140 which is telescoped within the tubular handle 110. An actuator in the form of knob 144 is attached to the extreme upper end of the rod 140. Spring 146 extends from a washer 142 held in place to the handle 110 by dimples 143. The spring 146 extends to another washer 145 attached to the rod 140 immediately below cap 147 at the top of the tubular handle 110.

Another embodiment of the spring arrangement is seen in FIG. 11. In this embodiment the rod 240 extends upward from blade 238 and is telescoped within the handle 210, similar to the embodiment of FIG. 6. However, in this embodiment, the helical compression spring 246 bears against the bottom of knob 244 and against the top of the handle cap 247. As may be seen the handle cap 247 is shaped for hand gripping.

Also referring to FIGS. 7 through 11, there may be seen a second embodiment for the shape of the trowel 228. As before the trowel is a portion of a single strap of metal which has the pedal portion 220 which at the distal end 222 is curved to form fulcrum 224 and is again attached at the axis of the handle at axis point 226 to either the handle or an extension thereof.

As before the trowel 228 is divided by a slot 236 into two tines 230 which are of equal width. In this embodiment the tines at parallel area 237 are turned or twisted or rotated about the edge of the slot 236 at right angles to the upper plane of the trowel for added reinforcement and strengthening. The tines are twisted back as shown. Also this rotation or twisting reduces the width of the face of the trowel 228. This reduction of the face of the trowel reduces the amount of soil displaced when the weed is removed as discussed above.

As seen in the drawing this rotation or twist of the trowel begins at a point above crotch 235 which is the top of the slot 236 or the beginning of the bifurcation. At point 239, about ½ the length of the tines 230, the tines are again twisted or rotated or turned about their axis to form trough 241 which is slightly angled or dished. I.e. the second rotation or twist in the tines is at point 239 about equal distance between the crotch 235 and the notch 234. It may be seen that the tines are rotated or twisted about 160° about their axis.

As may be seen on all models, the pedal is about equal in length or longer than the trowel and the fulcrum is about 90° of a circular arc. The handle is over five times the length of the pedal, or the trowel. Also, as clearly seen, and FIGS. 3, 5, 8, and 10, each of the tines is at least three times as wide as the width of the slot.

FIG. 8 illustrates spot weld 249 holding the tines 230 together below the crotch 235. The blade 238 would extend below the spot weld 249. The weld prevents any tendency for the tines to spread thus widening the slot 236.

The operation of all the models is basically the same. The gardener, standing erect, places the end of the trowel adjacent to a weed to be pulled. Then by placing his foot on the pedal, he pushes the trowel on the weed puller into the earth alongside the weed. The trowel is angled slightly toward the weed so that the notch formed at the end of the tines of the trowel will guide the weed roots into the slot. The puller operates particularly well with stalk type weeds in moist soil. The stalk of the weeds such as dandelions are thick and resistent to breaking. Also, moist soil is easier to penetrate and to pull the weed from. The handle of the weed puller is moved or rotated downward, thus pulling the weed from the ground. With the weed free of the ground, the weed is transported by moving the weed puller over a trash container. At that point holding the handle in one hand and pushing upon the hand actuator with the other, the blade is moved down the slot pushing the weed root and any debris from the slot, thus disengaging the weed from the trowel and permitting it to drop within the trash container.

Thus it may be seen that I have provided an implement to easily pull weeds.

As an aid to correlating the terms of the claims to the exemplary drawing, the following catalog of elements is provided:

10 handle
12 upper end
14 lower end
16 thimble
18 shaft
20 pedal
22 distal end
24 fulcrum
26 axis point
28 trowel
30 tines
32 end of tine
34 notch
35 crotch
36 slot
38 blade
40 rod
42 ear
44 knob
46 spring
48 projection The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim:

1. In a weed puller including
   a. an elongated handle having
      (i) an axis,
      (ii) an upper end, and
      (iii) a lower end,
   b. an earth trowel on the handle extending downward from the lower end,
   c. said trowel being bifurcated forming a pair of tines with a slot between them,
   d. the ends of the tines angled inward toward the slot to form a notch so that when the trowel is forced into the earth, a weed root is guided into the slot; wherein the improvement comprises:
   e. a blade in the slot, and
   f. ejecting means attached to the blade for moving the blade down the slot so as to remove a weed root in the slot,
   g. the ejector means includes
   h. a rod attached to the blade,
   j. said rod extending upward to a hand actuator
      (i) on the top thereof and
      (ii) adjacent the upper end of the handle,
   k. a spring between the rod and handle biasing the rod upward, and
   l. a metal strap extending normal to the handle at the upper part of the strap to form a pedal,
   m. the strap curving downward from the outer end of the pedal and back to the axis of the handle to form a fulcrum, and
   n. the bottom of the strap forming said trowel.

2. In a weed puller including
   a. an elongated handle having
      (i) an axis,
      (ii) an upper end, and
      (iii) a lower end,
   b. an earth trowel on the handle extending downward from the lower end,
   c. said trowel being bifurcated forming a pair of tines with a slot between them,
   d. the ends of the tines angled inward toward the slot to form a notch so that when the trowel is forced into the earth, a weed root is guided into the slot; wherein the improvement comprises:
   e. said tines twisted back from the crotch of the bifurcation so that the tines are parallel to one another from the crotch to about half way their length, and
   f. the bottom half of the tines further twisted so as to form a trough portion of the trowel.

3. The invention as defined in claim 2 further comprising:
   g. a blade in the slot,
   h. ejecting means attached to the blade for moving the blade down the slot so as to remove a weed root in the slot,
   j. a portion of said ejecting means being a hand actuator adjacent the upper end of the handle.

4. The invention as defined in claim 3 further comprising:
   k. a metal strap attached to the bottom of the handle,
   l. the strap extending normal to the handle at the upper part of the strap to form a pedal,
   m. the strap curving downward from the outer end of the pedal and back to the axis of the handle to form a fulcrum,
   n. the bottom of the strap forming said trowel, p1 o. a rod attached to the blade,
   p. said rod extending upward to the hand actuator on the top thereof, and
   q. a spring between the rod and handle biasing the rod upward.

5. The invention as defined in claim 3 further comprising:
   k. a spot weld between the tines below the crotch.

6. The invention as defined in claim 2 further comprising:
   g. a spot weld between the tines below the crotch.

* * * * *